UNITED STATES PATENT OFFICE.

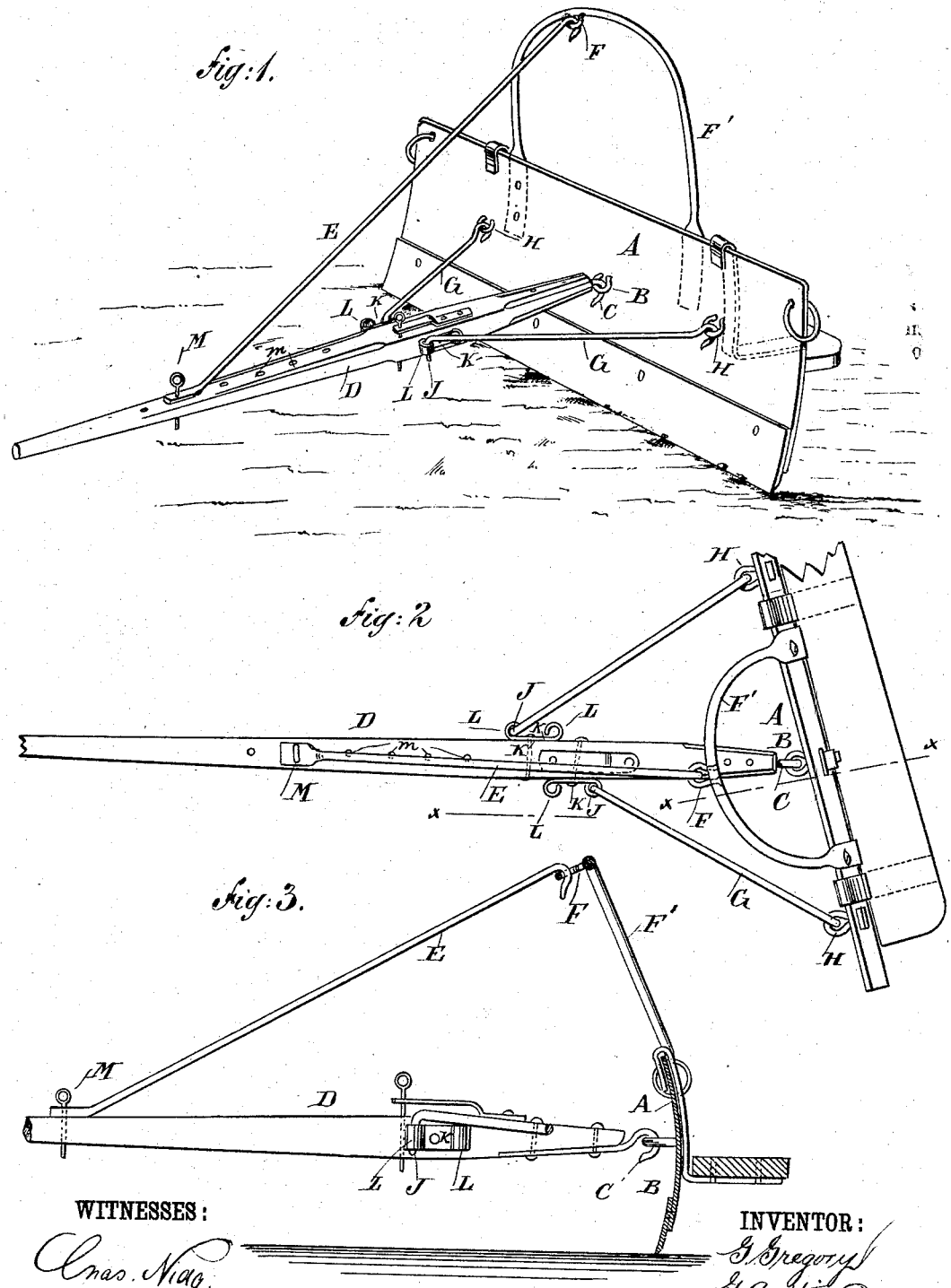

GEORGE GREGORY AND GEORGE AUSTIN, OF SKANEATELES, NEW YORK.

ROAD-SCRAPER.

SPECIFICATION forming part of Letters Patent No. 263,170, dated August 22, 1882.

Application filed May 19, 1882. (No model.)

*To all whom it may concern:*

Be it known that we, GEORGE GREGORY and GEORGE AUSTIN, of Skaneateles, Onondaga county, New York, have invented a new and Improved Road-Scraper, of which the following is a full, clear, and exact description.

The object of our invention is to facilitate the adjustment of a road-scraper plate in the horizontal plane.

This invention, which is an improvement on the road-scraper for which United States Letters Patent No. 250,911 were issued to us on the 13th day of December, 1881, consists in the combination, with the scraper-plate and the draft-pole, of brace-rods pivoted to the scraper-plate and provided at the free ends with hooks, which fit into sockets or loops on the side of the draft-pole.

The invention also consists in plates attached to the sides of the pole and having the ends bent over to form loops or sockets for receiving the hooks on the ends of the brace-rods, these plates being so attached that the front loop of one plate and the rear loop of the opposite plate will be on the same transverse line.

Reference is to be had to the accompanying drawings, forming part of this specification, in which similar letters of reference indicate corresponding parts in all the figures.

Figure 1 is a perspective view of our improved road-scraper. Fig. 2 is a plan view of the same. Fig. 3 is a longitudinal elevation of the same, parts being shown in section on line $x\ x$, Fig. 2.

The scraper-plate A is provided in the middle of its front surface with an eye or loop, B, for receiving a hook, C, at the rear end of a draft-pole, D, which draft-pole is braced by a rod, E, held on the pole D and hooked in an eye or loop in the top of a curved frame, F', projecting above the upper edge of the scraper-plate. Two brace-rods, G, having hooks on the inner ends, are hooked in eyes or loops H on the outer surface of the scraper-plate A, and at the sides of the middle eye, B, and the outer ends of the rods G are bent rectangularly to form straight hooks J. Two plates, K, having the ends bent over outwardly to form vertical loops, eyes, or sockets L, are secured to the sides of the draft-pole D in such a manner that the rear loop or socket L of one plate K will be on the same transverse line with the front loop or socket L of the opposite plate K. The hooks J at the outer ends of the rods G fit into these loops or sockets. If the hooks J of the rods G are passed into the two sockets or loops L on the same transverse line, the scraper-plate A will be held at right angles to the draft-pole D; but if the hook J of one rod G is placed in the loop or socket L in advance of the transverse line, and the hook J of the other rod G is placed in the loop or socket L to the rear of the transverse line, the scraper-plate will be inclined to the draft-pole D in the horizontal plane. The inclination of the scraper-plate can thus be adjusted on the horizontal plane very easily and rapidly. The vertical adjustment is accomplished by means of the rod E and a pin, M, passing through the rod and entering any one of a series of holes, $m$, in the draft-pole D.

The several parts of the road-scraper can be detached very easily, and the scraper can be folded very compactly for storage or transportation.

More than two loops or sockets L can be provided on each side of the draft-pole, and these loops may be formed and attached in any suitable manner.

Having thus described our invention, we claim as new and desire to secure by Letters Patent—

1. In a road-scraper, the combination, with the scraper-plate and draft-pole, of brace-rods attached to the scraper-plate and having hooks at the ends, and of loops or sockets attached to the sides of the draft-pole, substantially as herein shown and described, and for the purpose set forth.

2. In a road-scraper, the combination, with the scraper-plate A and the draft-pole D, of the brace-rods G, attached to the scraper-plate A and provided with hooks J at the ends, and of the plates K, attached to the sides of the pole D and forming loops or sockets L at the ends, substantially as herein shown and described, and for the purpose set forth.

3. In a road-scraper, the combination, with the scraper-plate A and the draft-pole D, of the brace-rods G, attached to the scraper-plate A and provided with hooks J at the ends, and of the plates K, attached to the sides of the pole D and forming loops or sockets L at the ends, the front loop or socket L of one plate K being on the same transverse line with the rear loop or socket L of the opposite plate K, substantially as herein shown and described, and for the purpose set forth.

GEORGE GREGORY.
GEORGE AUSTIN.

Witnesses:
 GEORGE BARROW,
 PHILIP D. BENSON.